Patented Jan. 2, 1923.

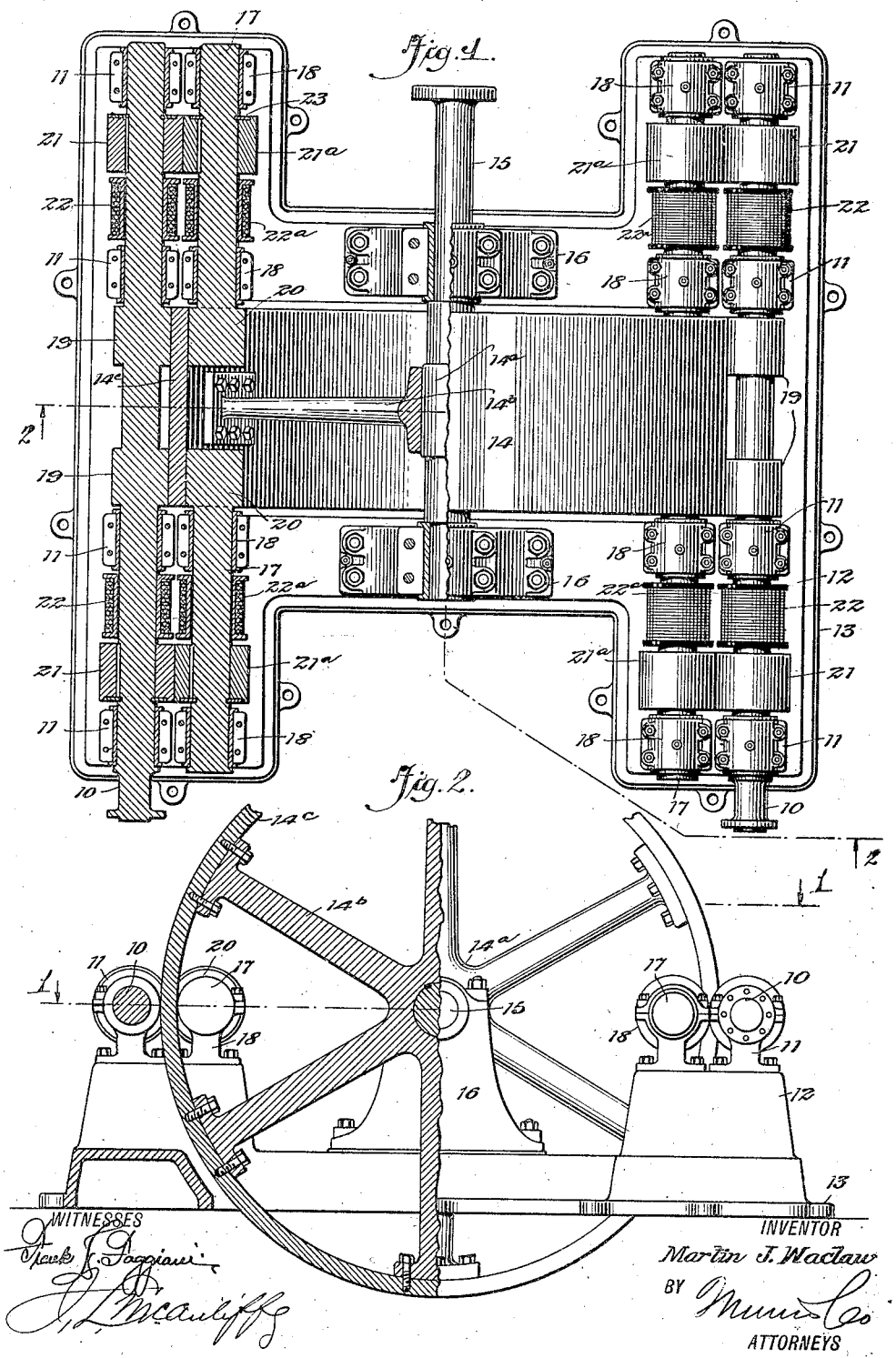

1,441,136

UNITED STATES PATENT OFFICE.

MARTIN J. WACLAW, OF BETHLEHEM, PENNSYLVANIA.

REDUCTION GEAR.

Application filed February 20, 1922. Serial No. 538,003.

*To all whom it may concern:*

Be it known that I, MARTIN J. WACLAW, a citizen of the United States, and a resident of Bethlehem, in the county of Northampton and State of Pennsylvania, have invented a new and Improved Reduction Gear, of which the following is a description.

My invention relates to a speed-reducing means and particularly to an electro-magnetic friction device for the purpose.

The invention although capable of wider use has particularly in view the reduction of speed of steam turbines and free from the difficulties and objections necessarily incident to toothed gearing systems which ordinarily are used in connection with steam turbines for reducing the speed.

The stated object and others as will appear are attained by a flywheel advantageously of the built-up type and a set of magnetic rollers adapted to exert a reducing influence on the flywheel at the rim thereof.

Reference is to be had to the accompanying drawings forming a part of this specification, it being understood that the drawings are merely illustrative of one example of the invention.

Figure 1 is a partly sectional plan view of a reduction gear embodying my invention;

Figure 2 is a partly sectional end elevation, the view being taken as indicated by the line 2—2, Figure 1.

It will be understood that although the invention is shown as embodied in two sets of rollers in association with high and low pressure turbine shafts, it will readily be understood that in units consisting of a single turbine only one set of rollers is required.

In carrying out my invention in accordance with the illustrated example the turbine shafts 10 turn in bearings 11 on an elevated portion 12 of a base frame 13. A pulley or flywheel designated generally by the numeral 14 is provided on a shaft 15 turning in bearings 16. The flywheel 14 in the preferred form is built up and comprises a hub 14ª and spokes 14ᵇ thereon, said spokes being secured by bolts or equivalent means to the rim 14ᶜ.

The pulley 14 lies with its rim directly within the turbine shafts 10 and I provide a pair of parallel shaft sections 17 in association with each turbine shaft 10, the shaft sections 17 of a pair alining and turning in bearings 18 on the frame 13. The turbine shafts 10 are formed with zones 19 of enlarged diameter at the flywheel 14 so that said enlarged zones constitute rollers integral with the turbine shafts and turning about the axes of the said turbine shafts 10 directly outside the periphery of the flywheel. Similarly, the shaft sections 17 parallel with the shafts 10 are formed with inner ends 20 of enlarged diameter to constitute rollers integral with the shafts 17 and disposed at the interior of the rim 14ᶜ of the flywheel and therefore disposed directly radially inward from the exterior rollers 19.

The bearings 11 are arranged in pairs near each end of the turbine shafts 10 and the bearings 18 for the roller shafts 17 being similarly disposed in pairs adjacent to the bearings 11. Between the end bearings 11, 18, and those bearings 11, 18 distant from the ends of the shafts 10, 17, I provide on the said shafts friction rollers 21, 21ª in contact with each other and keyed on the respective shafts 10 and 17. To subject the flywheel 14 to electro-magnetic action through the medium of the shafts 10, 17 I provide magnetizing coils 22 on each shaft 10 and magnetizing coils 22ª adjacent to the coils 22 and disposed about the shafts 17, the spools of the said coils 22, 22ª being suitably made rigid with the frame 12 and out of contact with the shafts 10 and 17, whereby slip-ring commutators and brushes are made unnecesssary.

In order to facilitate the placing of the magnetizing coils in position the outboard rollers 21, 21ª may be held by semi-circular plates 23 engaging in grooves machined in the shafts 10 and 17 or the bobbins of the magnetizing coils may be made in half sections and assembled on the shafts and wound with wire. It will be understood that the several bearings 11 and 18 are constructed of non-magnetic metal in order to confine the magnetic circuit to the shafts and their integral rollers and to the rim of the flywheel. The shafts and rim, it being understood, are made of steel having a good magnetic quality and the maximum cross section is availed of wherever possible to secure low flux density. The rim of the flywheel will be subjected to the force resulting from the magnetic attraction between the pole faces of the roller zones 19, 20, said magnetic lines being through the shafts 10 with their roller shafts 19, the shafts 17 and their roller shafts 20, and the rim 14ᶜ.

The number of magnetic coils 22 and 22ᵃ and rollers 21, 21ᵃ with rollers 19 and 20 may be multiplied in number on the same shafts 10 and 17 if a more positive drive is desired, and a number of fly-wheels or driven members can be driven instead of one, as shown in the drawings.

Advantages of the reduction gear described are smooth and comparatively noiseless running; no oil needed on rolling surfaces; an immaterial disturbance of alinement will not prevent a satisfactory performance; the reduction gear as described is characterized by freedom from strains due to error of pitch and inertia of generator, the whole making for higher efficiency and longer service.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A reduction gear of the class described, comprising a driven shaft, a pulley carried on said shaft, a driving shaft, a roller on said shaft in frictional contact with said pulley, magnetic coils surrounding said shaft to increase the gripping action of the rollers with the pulley, a second shaft and a second magnetic coil surrounding said secondary shaft, said secondary shaft being also in contact with said pulley and driving shaft.

2. A reduction gear of the class described, comprising a driving shaft, a friction roller on each end of said driving shaft, a second shaft parallel with the driving shaft, friction rollers on said second shaft in contact with said first-mentioned friction rollers, a driven pulley having a rim extending between both of said shafts, rollers carried by both of said shafts in contact with said rim for driving the same, and magnetic means between the friction rollers and the driving rollers for producing a magnetic flux to increase the gripping action of the friction rollers.

3. A reduction gear of the class described, comprising a wheel presenting a substantially wide rim, a driving shaft, a pair of rollers on said shaft in contact with said rim and adapted to drive the same, a friction roller adjacent each end of said driving shaft, a magnetic coil arranged between one of the friction rollers and one of the driving rollers, a secondary shaft, a plurality of rollers on said secondary shaft, certain of said rollers contacting with the inner surface of said rim and certain others with the frictional rollers mounted adjacent the end of the driving shaft, said secondary shaft being adapted to aid the driving shaft to transmit its power to the wheel.

4. A driven element and reducing means therefor comprising an elongated roller turning with said driven element, magnetic coils on said elongated roller, a rim wheel adjacent to and in frictional contact with said elongated roller, a co-axial shaft parallel with said driven element and extending into said rim, rollers on said shaft and magnetizing coils on said driven element and on said shaft.

5. In combination with a wheel comprising a substantially wide rim, a driving shaft, a plurality of rollers and a magnetic coil mounted on said shaft, a secondary shaft arranged adjacent the driving shaft, rollers mounted on said secondary shaft, certain of said rollers mounted on the driving shaft being in frictional contact with the rim of said wheel and certain others in frictional contact with the rollers mounted on the secondary shaft, said magnetic coil producing a magnetic flux to increase the frictional grip between the rollers on the driving shaft, the wheel, and the rollers on the secondary shaft.

6. In combination with a driving shaft, a frictional roller carried on said shaft adjacent each end thereof, a pair of transmission rollers also carried on said shaft adjacent its center, a coil surrounding said shaft between one end roller and one of the intermediate rollers, a secondary shaft, rollers on said secondary shaft in frictional contact with the end rollers of the driving shaft, a pair of transmission rollers on said secondary shaft, a magnetic coil surrounding said secondary shaft and arranged between one end roller and one of the transmission rollers, and a driven element disposed between said driving shaft and the secondary shaft frictionally and magnetically driven by said transmission rollers.

7. In a drive of the class described, a driving and a driven member, said driving member comprising a plurality of frictional rollers and a plurality of transmission rollers, a shaft mounting said rollers, said transmission rollers being in contact with said driven member, a second shaft positioned adjacent said driving shaft, a plurality of rollers mounted on said second shaft and in contact with the frictional rollers of the first-mentioned shaft, a plurality of transmission rollers also mounted on said secondary shaft and in contact with said driven member, and a plurality of magnetic coils positioned on said shafts adjacent said rollers for magnetizing the shafts and rollers, thereby increasing the frictional contact between the driven and the driving members.

MARTIN J. WACLAW.